US012694733B2

(12) United States Patent  
Urano et al.

(10) Patent No.: US 12,694,733 B2  
(45) Date of Patent: Jul. 28, 2026

(54) AUTONOMOUS DRIVING VEHICLE

(71) Applicant: TOYOTA JIDOSHA KABUSHIKI KAISHA, Toyota (JP)

(72) Inventors: Hiromitsu Urano, Numazu (JP); Masamichi Ohsugi, Sunto-gun Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 122 days.

(21) Appl. No.: 18/746,227

(22) Filed: Jun. 18, 2024

(65) Prior Publication Data

US 2025/0005977 A1 Jan. 2, 2025

(30) Foreign Application Priority Data

Jun. 27, 2023 (JP) ................................. 2023-104788

(51) Int. Cl.
| | |
|---|---|
| *H04N 19/146* | (2014.01) |
| *B60W 60/00* | (2020.01) |
| *G07C 5/08* | (2006.01) |
| *H04N 19/426* | (2014.01) |

(52) U.S. Cl.
CPC ............. *G07C 5/085* (2013.01); *B60W 60/00* (2020.02); *B60W 2420/403* (2013.01); *B60W 2420/408* (2024.01); *B60W 2520/10* (2013.01); *B60W 2552/10* (2020.02); *B60W 2720/10* (2013.01); *H04N 19/146* (2014.11); *H04N 19/426* (2014.11)

(58) Field of Classification Search
CPC .... G07C 5/085; H04N 19/146; H04N 19/426;

B60W 60/00; B60W 2552/10; B60W 2420/408; B60W 2420/403; B60W 2520/10; B60W 2720/10
USPC ......................................................... 701/23
See application file for complete search history.

(56) References Cited

U.S. PATENT DOCUMENTS

| | | | | |
|---|---|---|---|---|
| 6,356,837 | B1 * | 3/2002 | Yokota | G01C 21/34 |
| | | | | 701/461 |
| 7,319,931 | B2 * | 1/2008 | Uyeki | G08G 1/096844 |
| | | | | 701/423 |
| 11,734,017 | B1 * | 8/2023 | Brinkmann | G06F 9/3891 |
| | | | | 712/220 |
| 2015/0281638 | A1 * | 10/2015 | Miyauchi | H04N 7/0117 |
| | | | | 348/445 |
| 2018/0232967 | A1 | 8/2018 | Segawa et al. | |
| 2019/0193745 | A1 * | 6/2019 | Golov | G05D 1/227 |
| 2020/0026435 | A1 | 1/2020 | Satou et al. | |

(Continued)

FOREIGN PATENT DOCUMENTS

| | | | |
|---|---|---|---|
| JP | 2011231639 A | * | 11/2011 |
| JP | 2018-133085 A | | 8/2018 |

(Continued)

*Primary Examiner* — Matthias S Weisfeld

(74) *Attorney, Agent, or Firm* — Dinsmore & Shohl LLP

(57) ABSTRACT

The vehicle of the present disclosure includes a sensor for recognizing an object around the vehicle, at least one processor, and at least one memory storing a plurality of instructions executable by the at least one processor. The plurality of instructions causes the at least one processor to store data acquired by the sensor during the autonomous driving, and to suppress a storage distance of the data when a speed of the vehicle is low, as compared to when the speed of the vehicle is high.

8 Claims, 6 Drawing Sheets

(56) References Cited

U.S. PATENT DOCUMENTS

| | | | |
|---|---|---|---|
| 2020/0302233 A1 | 9/2020 | Iwasaki | |
| 2022/0262128 A1* | 8/2022 | Nakamura | ............. G08G 1/166 |
| 2023/0063930 A1 | 3/2023 | Ichida et al. | |
| 2023/0230368 A1 | 7/2023 | Shokonji | |
| 2024/0416849 A1* | 12/2024 | Ghannam | ............ B60H 1/0075 |

FOREIGN PATENT DOCUMENTS

| | | |
|---|---|---|
| JP | 6761002 B2 | 9/2020 |
| WO | 2019/116423 A1 | 6/2019 |
| WO | 2021/241189 A1 | 12/2021 |

* cited by examiner

AUTONOMOUS DRIVING VEHICLE

CROSS-REFERENCE TO RELATED APPLICATION

The present application claims priority under 35 U.S.C. § 119 to Japanese Patent Application No. 2023-104788, Jun. 27, 2023, the contents of which application are incorporated herein by reference in their entirety.

BACKGROUND

Field

The present disclosure relates to a vehicle travelable by autonomous driving.

Background Art

An autonomous driving technique using a machine learning model is known. WO2019116423A1 discloses a method for collecting training data usable for learning of the machine learning model. As documents showing the technical level of the technical field related to the present disclosure, JP6761002B2 and WO2021241189A1 can be exemplified in addition to WO2019116423A1.

SUMMARY

As a method for verifying autonomous driving of the vehicle afterwards, it is considered to store autonomous driving data generated during the autonomous driving being executed in an on-board storage as log data. However, since the capacity of the on-board storage is limited, it is desirable to avoid a situation in which the minimum necessary log data cannot be stored.

An object of the present disclosure is to provide a technique capable of reducing shortage of an available capacity of a storage area for data for verifying autonomous driving of a vehicle later.

In order to achieve the above object, the present disclosure provides a vehicle travelable by autonomous driving. The vehicle of the present disclosure includes a sensor for recognizing an object around the vehicle, at least one processor, and at least one memory storing a plurality of instructions executable by the at least one processor. The plurality of instructions causes the at least one processor to store data acquired by the sensor during the autonomous driving, and to suppress a storage distance of the data when a speed of the vehicle is low, as compared to when the speed of the vehicle is high.

When the speed of the vehicle is low, the distance over which the object should be recognized is shorter than when the speed of the vehicle is high. Therefore, when the speed of the vehicle is low, the storage distance of the data to be stored for verifying the autonomous driving later can be suppressed as compared to when the speed of the vehicle is high. According to the vehicle of the present disclosure, it is possible to suppress the shortage of the available capacity of the storage area of the data by reducing the storage distance of the data according to the speed of the vehicle.

DETAILED DESCRIPTION

1. Automatic Driving of Vehicle

Figure 1:
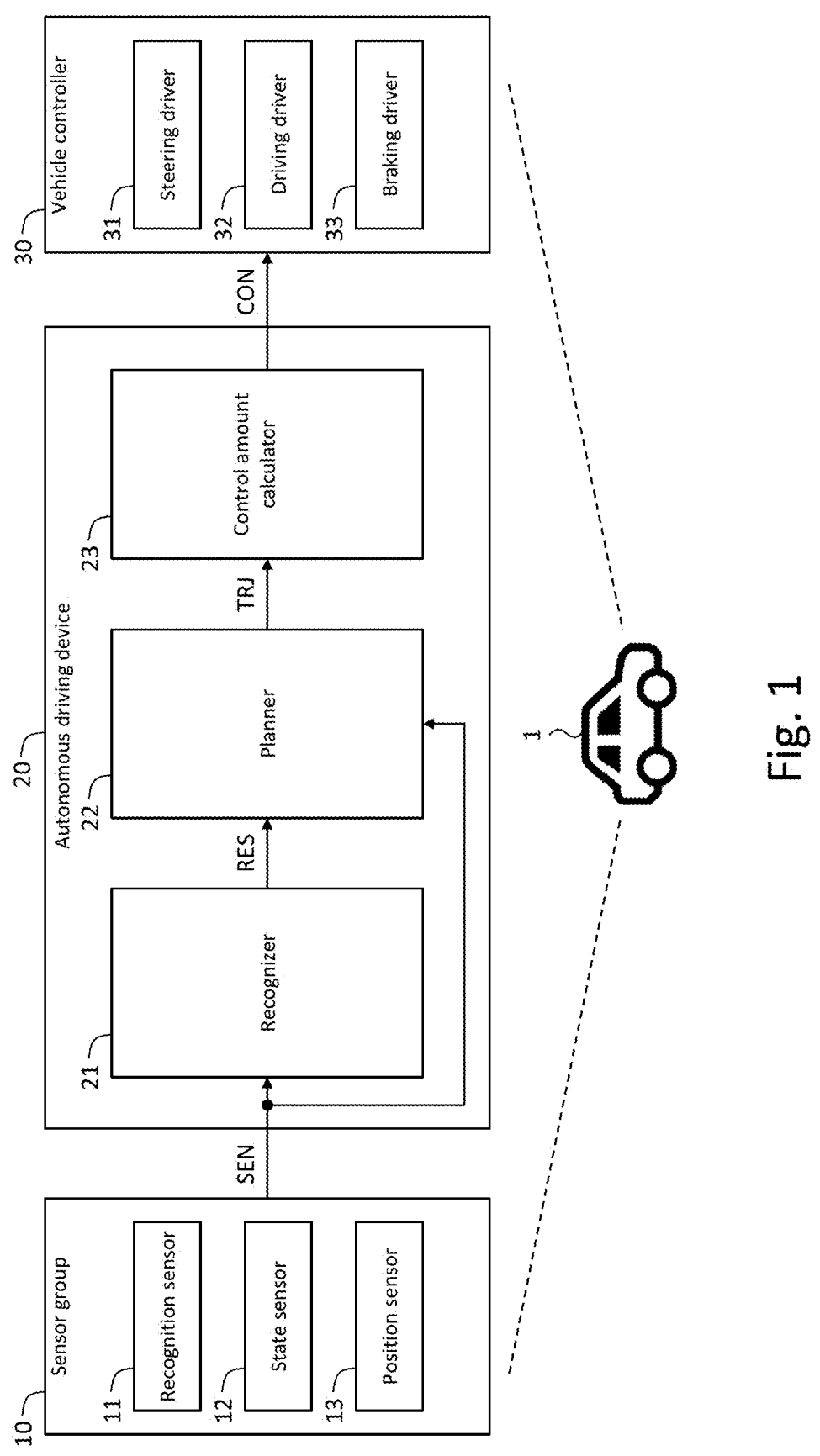
FIG. 1 is a block diagram illustrating an example of a configuration related to autonomous driving of a vehicle according to an embodiment.

FIG. 1 is a block diagram illustrating an example of a configuration related to autonomous driving of a vehicle 1 according to the present embodiment. The autonomous driving is to autonomously perform at least one of steering, acceleration, and deceleration of the vehicle 1 without depending on driving operation by an operator. The autonomous driving is a concept including not only fully autonomous driving but also risk avoidance control, lane keep assist control, and the like. The operator may be a driver riding in the vehicle 1 or a remote operator who remotely operates the vehicle 1.

The vehicle 1 includes a sensor group 10, an autonomous driving device 20, and a vehicle controller 30.

The sensor group 10 includes a recognition sensor 11 used for recognizing a situation around the vehicle 1. Examples of the recognition sensor 11 include a camera, a laser imaging detection and ranging (LiDAR), and a radar. The sensor group 10 may further include a state sensor 12 that detects a state of the vehicle 1, a position sensor 13 that detects a position of the vehicle 1, and the like. Examples of the state sensor 12 include a speed sensor, an acceleration sensor, a yaw rate sensor, and a steering angle sensor. As the position sensor 13, a global navigation satellite system (GNSS) sensor is exemplified.

The sensor detection information SEN is information obtained by the sensor group 10. For example, the sensor detection information SEN includes an image captured by a camera. As another example, the sensor detection information SEN may include point group information obtained by LiDAR. The sensor detection information SEN may include vehicle state information indicating the state of the vehicle 1. The sensor detection information SEN may include position information indicating the position of the vehicle 1.

The autonomous driving device 20 includes a recognizer 21, a planner 22, and a control amount calculator 23.

The recognizer 21 receives the sensor detection information SEN. The recognizer 21 recognizes the situation around the vehicle 1 based on the information obtained by the recognition sensor 11. For example, the recognizer 21 recognizes an object around the vehicle 1. Examples of the object include a pedestrian, another vehicle (preceding vehicle, parked vehicle, or the like), a white line, a road structure (for example, a guard rail or a curb), a fallen object, a traffic light, an intersection, and a sign. Recognition result information RES indicates a recognition result by the recognizer 21. For example, the recognition result information RES includes object information indicating a relative position and a relative speed of the object with respect to the vehicle 1.

The planner 22 receives recognition result information RES from the recognizer 21. The planner 22 may receive vehicle state information, position information, and map information generated in advance. The map information may be high-precision three dimensional map information. The planner 22 generates a travel plan of the vehicle 1 based on the received information. The travel plan may be for reaching a destination set in advance or for avoiding a risk. Examples of the travel plan include maintaining the current travel lane, changing lanes, passing, turning right or left, steering, accelerating, decelerating, and stopping. Further, the planner 22 generates a target trajectory TRJ required for the vehicle 1 to travel in accordance with the travel plan. The target trajectory TRJ includes a target position and a target velocity.

The control amount calculator 23 receives the target trajectory TRJ from the planner 22. The control amount calculator 23 calculates a control amount CON required for the vehicle 1 to follow the target trajectory TRJ. The control amount CON can also be described as a control amount which is required to reduce a deviation between the vehicle 1 and the target trajectory TRJ. The control amount CON includes at least one of a steering control amount, a driving control amount, and a braking control amount.

The recognizer 21 includes at least one of a rule-based model and a machine learning model. The rule-based model performs recognition processing based on a predetermined rule group. Examples of the machine learning model include a neural network (NN), a support vector machine (SVM), a regression model, and a decision tree model. The NN may be a convolutional neural network (CNN), a recurrent neural network (RNN), or a combination thereof. The type of each layer, the number of layers, and the number of nodes in the NN may be arbitrarily determined. The machine learning model is generated in advance through machine learning. The recognizer 21 performs recognition processing by inputting the sensor detection information SEN to the model. The recognition result information RES is output from the model or generated based on the output from the model.

Similarly, the planner 22 includes at least one of a rule-based model and a machine learning model. The planner 22 performs planning processing by inputting the recognition result information RES to the model. The target trajectory TRJ is output from the model or generated based on the output from the model.

Similarly, the control amount calculator 23 includes at least one of a rule-based model and a machine learning model. The control amount calculator 23 performs the control amount calculation processing by inputting the target trajectory TRJ to the model. The control amount CON is output from the model or generated based on the output from the model.

Two or more of the recognizer 21, the planner 22, and the control amount calculator 23 may be integrally configured. All of the recognizer 21, the planner 22, and the control amount calculator 23 may be integrally configured (End-to-End configuration). For example, the recognizer 21 and the planner 22 may be integrally configured by an NN that outputs the target trajectory TRJ from the sensor detection information SEN. Even in the case of the integrated configuration, intermediate products such as the recognition result information RES and the target trajectory TRJ may be output. For example, when the recognizer 21 and the planner

22 are integrally configured by the NN, the recognition result information RES may be an output of an intermediate layer of the NN.

In the present embodiment, a machine learning model is used in at least a part of the recognizer 21, the planner 22, and the control amount calculator 23 that constitute the autonomous driving device 20. That is, at least one of the recognizer 21, the planner 22, and the control amount calculator 23 includes a machine learning model. The autonomous driving device 20 performs at least a part of information processing for autonomous driving of the vehicle 1 using the machine learning model.

The vehicle controller 30 includes a steering driver 31, a driving driver 32, and a braking driver 33. The steering driver 31 supplies a control signal to a steering device that steers the wheels. For example, the steering device includes an electric power steering (EPS) device. The driving driver 32 inputs a control signal to a driving device that generates a driving force. Examples of the drive device include an engine, an electric motor, and an in-wheel motor. The braking driver 33 supplies a control signal to a braking device that generates a braking force. The vehicle controller 30 receives the control amount CON output from the autonomous driving device 20. The vehicle controller 30 operates at least one of the steering driver 31, the driving driver 32, and the braking driver 33 with the control amount CON as a target value. Thus, the vehicle 1 travels so as to follow the target trajectory TRJ.

Figure 2:
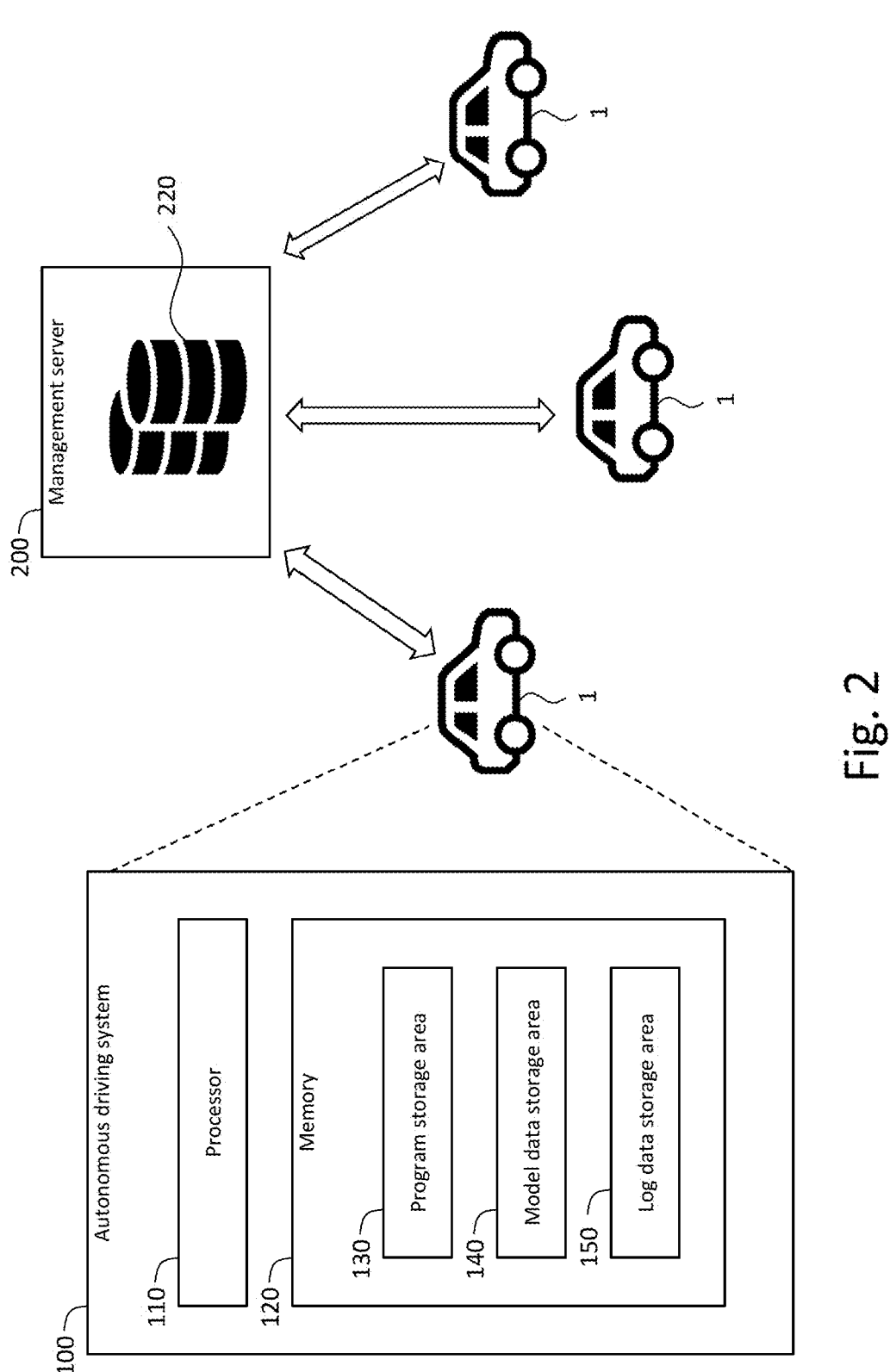
FIG. 2 is a conceptual diagram illustrating an example of a configuration of an autonomous driving system according to the embodiment.

FIG. 2 is a conceptual diagram illustrating an example of a configuration of the autonomous driving system 100 according to the present embodiment. The autonomous driving system 100 is mounted on the vehicle 1 and performs information processing for autonomous driving of the vehicle 1. The autonomous driving system 100 has at least the function of the autonomous driving device 20 described above. Further, the autonomous driving system 100 may include the sensor group 10 and the vehicle controller 30.

The autonomous driving system 100 includes one or more processors 110 (hereinafter, simply referred to as a processor 110). The processor 110 executes various processes. Examples of the processor 110 include a central processing unit (CPU), an application specific integrated circuit (ASIC), and a field-programmable gate array (FPGA). The recognizer 21, the planner 22, and the control amount calculator 23 may be implemented by a single processor 110 or may be implemented by separate processors 110. In addition, in a case where the autonomous driving system 100 includes the vehicle controller 30, the autonomous driving device 20 and the vehicle controller 30 may be realized by the single processor 110 or may be realized by the separate processors 110. It should be noted that the separate processors 110 may include different types of processors 110.

The autonomous driving system 100 includes one or more memories 120 (hereinafter, simply referred to as a memory 120). Examples of the memory 120 include a hard disk drive (HDD), a solid state drive (SSD), a volatile memory, and a nonvolatile memory. The memory 120 includes at least a program storage area 130, a model data storage area 140, and a log data storage area 150. The program storage area 130, the model data storage area 140, and the log data storage area 150 may be implemented by a single memory 120 or may be implemented by separate memories 120. It should be noted that the separate memories 120 may include different types of memories 120.

The program storage area 130 stores one or more programs. Each program is composed of a plurality of instructions. The program is a computer program for controlling the vehicle 1, and is executed by the processor 110. Various processes by the autonomous driving system 100 may be realized by cooperation between the processor 110 that executes the program and the memory 120. The program may be recorded in a computer-readable storage medium.

The model data storage area 140 stores model data used for the autonomous driving. The model data is data of a model included in the recognizer 21, the planner 22, and the control amount calculator 23. As described above, in the present embodiment, at least one of the recognizer 21, the planner 22, and the control amount calculator 23 includes a machine learning model, but the model has already been trained (hereinafter, the machine learning model means a trained machine learning model). The parameters of the machine learning model are included in the model data.

The log data storage area 150 stores, as log data, autonomous driving data generated during the execution of the autonomous driving. The autonomous driving data is data related to the autonomous driving using the machine learning model. The autonomous driving data includes input data input to the machine learning model, intermediate calculation data obtained in calculation processing by the machine learning model, and control data of vehicle control executed based on an output of the machine learning model. The input data includes the sensor detection information SEN. The intermediate calculation data includes at least one of the recognition result information RES output from the recognizer 21, the target trajectory TRJ output from the planner 22, and the control amount CON output from the control amount calculator 23. The intermediate calculation data may include a reason for determination in the recognition processing by the recognizer 21. The control data includes at least one of a control signal given from the steering driver 31 to the steering device, a control signal given from the driving driver 32 to the driving device, and a control signal given from the braking driver 33 to the braking device. The autonomous driving data stored as log data in the log data storage area 150 is used for verifying the autonomous driving later.

The management server 200 is an external device that is present outside the vehicle 1. The management server 200 communicates with one or more vehicles 1 via a communication network. During the autonomous driving or after the autonomous driving is finished, the processor 110 of the vehicle 1 may upload at least a part of the log data stored in the log data storage area 150 to the management server 200. The processor 110 may delete the log data uploaded to the management server 200 from the log data storage area 150.

The management server 200 includes a database 220. The management server 200 acquires log data uploaded from one or more vehicles 1. The management server 200 stores the acquired log data in the database 220. The management server 200 stores the log data for at least a predetermined period. The log data is used for verification of the autonomous driving using the machine learning model.

2. Appropriate Storage of Autonomous Driving Data

In order to verify the autonomous driving using the machine learning model with high accuracy, it is desirable to store all autonomous driving data related to the autonomous driving. However, the capacity of the log data storage area 150 is limited. Therefore, if all of the autonomous driving data is to be stored at all times, the log data storage area 150 may be full in the middle of the autonomous driving. When the log data storage area 150 is full, the autonomous driving data acquired in the subsequent autonomous driving cannot be stored.

What is important in verifying the autonomous driving using the machine learning model is to leave the minimum log data required for verification over the entire period from the start to the end of the autonomous driving. In some embodiments, when there is room in the available capacity of the log data storage area 150, all of the autonomous driving data related to the autonomous driving is stored as the log data.

In the present embodiment, in order to suppress the shortage of the available capacity of the log data storage area 150, the data to be stored in the log data storage area 150 is limited to an amount necessary for verifying the autonomous driving, thereby reducing a data storage amount. In the present embodiment, the sensor detection information SEN input to the machine learning model is set as a reduction target of the data storage amount. More specifically, the data acquired by the recognition sensor 11 is set as the reduction target of the data storage amount. The data acquired by the recognition sensor 11 has a particularly large ratio of the data amount to the sensor detection information SEN. In addition, not all of the data acquired by the recognition sensor 11 is used for the autonomous driving. Therefore, by setting the data acquired by the recognition sensor 11 as the reduction target of the data storage amount, it is possible to increase the effect of suppressing the shortage of the available capacity of the log data storage area 150.

The program stored in the model data storage area 140 includes instructions for causing the processor 110 to reduce the data amount of the recognition sensor 11 stored in the log data storage area 150. When the instructions are executed by the processor 110, the processor 110 executes processing for reducing the data storage amount as exemplified below.

2-1. First Example

In the first example of processing for reducing the data storage amount, a LiDAR that scans the front of the vehicle 1 is provided as the recognition sensor 11. Point group data acquired by the LiDAR is set as a reduction target of the data storage amount.

In the first example, the vehicle speed of the vehicle 1 is referred to in the determination for distinguishing between the point group data to be stored and the point group data not to be stored. When the vehicle speed is low, it is assumed that the object that affects the movement of the vehicle 1 is limited to an object near the vehicle 1. Therefore, since the object to be recognized can be limited to the object near the vehicle 1, the point group data near the vehicle 1 is preferentially stored. On the other hand, if the vehicle speed is high, it is assumed that the movement of the vehicle 1 is affected not only by the object near the vehicle 1 but also by an object far from the vehicle 1. Therefore, since the objects to be recognized include not only the object near the vehicle 1 but also the object far from the vehicle 1, the point group data of the object far from the vehicle 1 is also stored in addition to the point group data of the object near the vehicle 1.

Whether the vehicle speed is low or high is determined by comparing the vehicle speed with a threshold value. The threshold value of the vehicle speed can be set arbitrarily. For example, if the legal maximum speed is 60 km/h, half of the speed, i.e., 30 km/h, may be set as the reference value.

In a first example, the storage distance for storing the point group data is switched depending on whether the vehicle speed is equal to or higher than the threshold value. The storage distance is increased when the vehicle speed is equal to or higher than the threshold value, and the storage distance is decreased when the vehicle speed is lower than the threshold value. The storage distance is a distance of a point group at a position farthest from the vehicle 1 among point groups of which data is stored in the log data storage area 150. Therefore, the data of the point group at the distance equal to or less than the storage distance among the point group data is stored, but the data of the point group at the distance exceeding the storage distance is not stored. The storage distances may be, for example, 80 m. The storage distances in the case where the vehicle speed is less than the threshold value may be, for example, 20 to 30 m.

Figure 3:
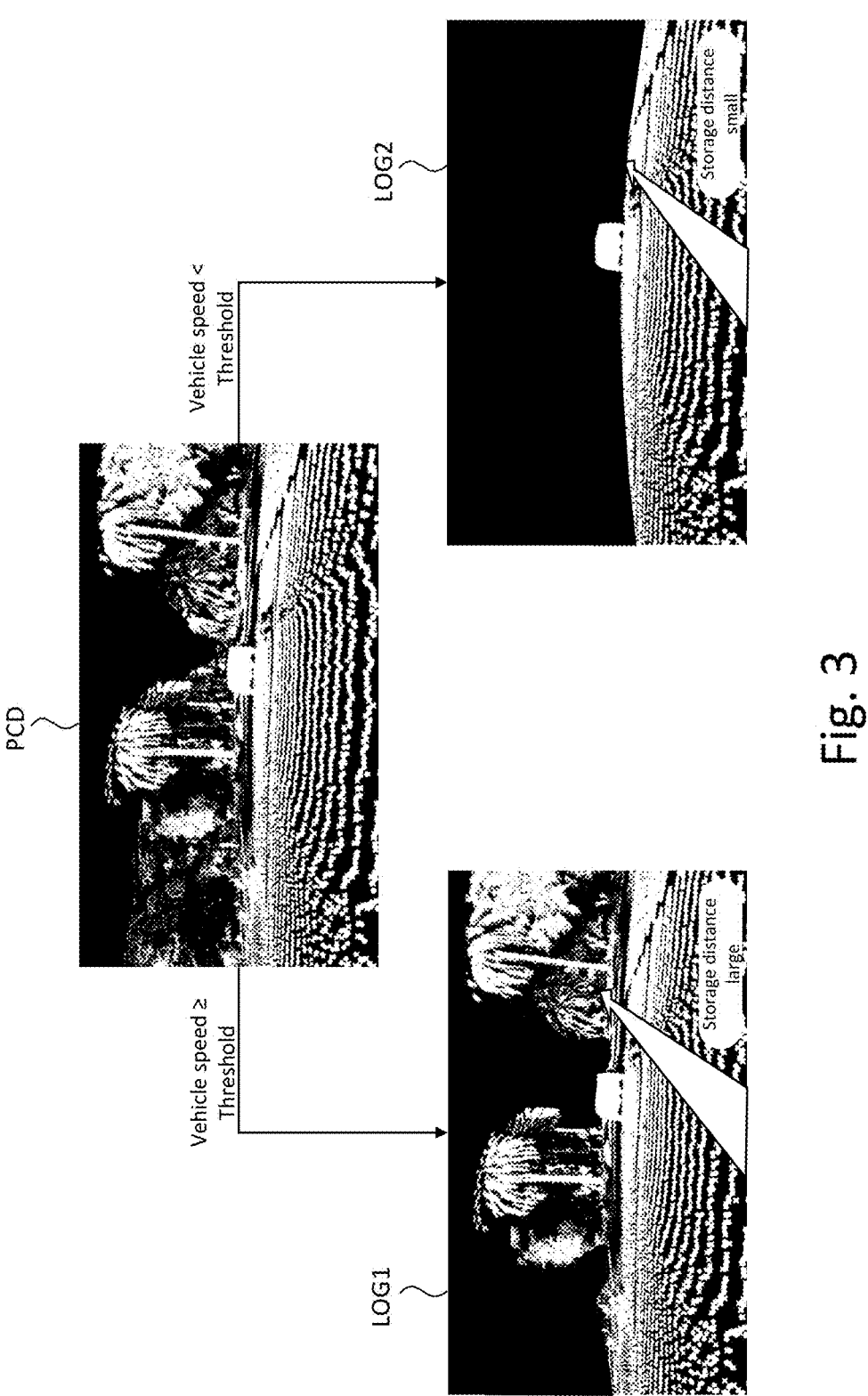
FIG. 3 is a conceptual diagram for explaining a first example of processing for reducing a data storage amount according to the embodiment.

FIG. 3 is a conceptual diagram for explaining the first example. FIG. 3 illustrates an image of the point group data PCD acquired by the LiDAR. The point group data LOG1 stored in the log data storage area 150 is also depicted in the figure. The point group data LOG2 stored in the log data storage area 150 is also depicted in the figure. As shown in these images, by suppressing the storage distance of the point group data according to the vehicle speed, it is possible to suppress the shortage of the available capacity of the storage area of the log data storage area 150.

In the first example, the storage distance of the point group data is switched depending on whether the vehicle speed is equal to or higher than the threshold value, but the storage distance of the point group data may be continuously changed in conjunction with the vehicle speed. For example, the distance that the vehicle travels during a predetermined time may be used as the data storage distance. As a concrete example, when the predetermined time is 3 seconds, the storage distance of the point group may be 45 m if the vehicle speed is 54 km/h, and the storage distance of the point group may be 15 m if the vehicle speed is 18 km/h.

Further, a minimum storage distance may be set for the storage distance of the point group data. The distance required for the vehicle 1 to stop can be the minimum storage distance. For example, when the speed is zero, if 5 m is required for the vehicle 1 from the start to the stop by sudden braking, 5 m may be set as the minimum storage distance.

2-2. Second Example

In the second example of processing for reducing the data storage amount, as in the first example, a LiDAR that scans the front of the vehicle 1 is provided as the recognition sensor 11. Then, as in the first example, the point group data acquired by the LiDAR is set as a reduction target of the data storage amount.

In the second example, in addition to the processing for reducing the data storage amount according to the first example, the maximum vehicle speed is limited according to the available capacity of the log data storage area 150. By limiting the maximum vehicle speed, the vehicle speed is forcibly suppressed. If the vehicle speed is suppressed, the distance of the object to be recognized from the vehicle 1 becomes shorter, and the storage distance of the point group data is suppressed. In the processing for reducing the data storage amount according to the second example, when the available capacity of the log data storage area 150 is small, the maximum vehicle speed is suppressed to forcibly suppress the storage distance of the point group data, and thus it is possible to more effectively suppress the shortage of the available capacity.

In the second example, the maximum vehicle speed is switched depending on whether or not the available capacity of the log data storage area 150 is equal to or greater than a threshold value. The maximum vehicle speed is increased when the available capacity is equal to or greater than the threshold value, and the maximum vehicle speed is decreased when the available capacity is less than the threshold value. For example, when the available capacity is equal to or greater than a threshold value, the maximum vehicle speed may be set to a legal maximum speed. When the available capacity is less than the threshold value, the maximum vehicle speed may be set to a predetermined speed lower than the legal maximum speed. The threshold value of the available capacity may be set to any capacity. For example, the threshold value may be set to half the maximum capacity of the log data storage area 150. The predetermined speed may be set to any speed. For example, the predetermined speed may be set to half the legal maximum speed.

Figure 4:
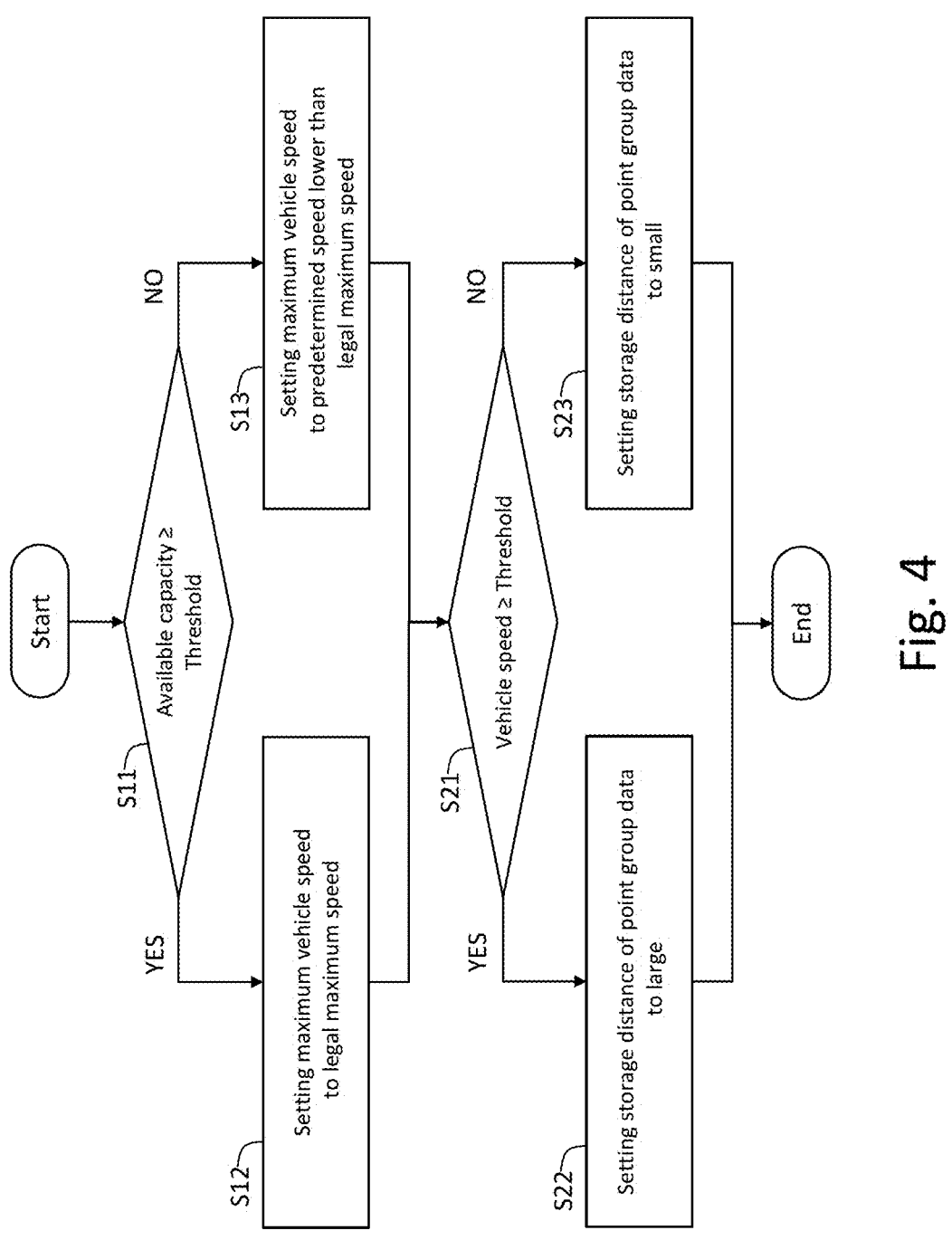
FIG. 4 is a conceptual diagram for explaining a second example of processing for reducing the data storage amount according to the embodiment.

FIG. 4 is a flowchart for explaining the second example. In the second example, the processing for reducing the data storage amount is performed in accordance with the procedure shown in this flowchart. Steps S11 to S13 in the flowchart are processes for limiting the maximum vehicle speed in accordance with the available capacity of the log data storage area 150. Steps S21 to S23 executed after these processes are the same as those in the first example.

In step S11, it is determined whether the available capacity of the log data storage area 150 is equal to or greater than the threshold value. If the available capacity is equal to or greater than the threshold value, the maximum vehicle speed is set to the legal maximum speed in step S12. If the available capacity is less than the threshold value, the maximum vehicle speed is set to a predetermined speed lower than the legal maximum speed in step S13. Then, step S12 is executed after step S13 or step S21.

In step S21, it is determined whether the vehicle speed is equal to or higher than a threshold speed. If the vehicle speed is equal to or higher than the threshold speed, the storage distance of the point group data is set to a large value in step S22. If the vehicle speed is less than the threshold speed, the storage distance of the point group data is set to a small value in step S23. When the available capacity of the log data storage area 150 is less than the threshold value, the probability that the vehicle speed will be less than the threshold speed increases due to the maximum vehicle speed being suppressed. As a result, the vehicle speed becomes less than the threshold speed with a higher probability than in a case where the available capacity is equal to or greater than the threshold value, and thus the storage distance of the point group data is easily reduced, and the shortage of the available capacity of the log data storage area 150 is suppressed.

In the second example, the maximum vehicle speed is switched depending on whether the available capacity of the log data storage area 150 is equal to or greater than the threshold value. However, the maximum vehicle speed may be continuously changed in conjunction with the available capacity. For example, the maximum vehicle speed may be set to the legal maximum speed when the available capacity is a predetermined capacity, and a speed reduction with respect to the legal maximum speed may be set in proportion to the difference from the predetermined capacity when the available capacity is less than the predetermined capacity.

2-3. Third Example

In the third example of processing for reducing the data storage amount, a front LiDAR that scans the front of the vehicle 1 is provided as the recognition sensor 11. In addition, a rear LiDAR that scans the rear of the vehicle 1 is also provided as the recognition sensor 11. In the third example, front point group data (hereinafter, referred to as front data) acquired by the front LiDAR and rear point group data (hereinafter, referred to as rear data) acquired by the rear LiDAR are set as reduction targets of the data storage amount.

In the third example, when the vehicle 1 travels on a multi-lane road, the data storage distance of the rear data is suppressed in accordance with the legal maximum speed set for the road. When the vehicle 1 travels on the multi-lane road, the vehicle 1 may change lanes. Since it is necessary to pay attention to the movement of the vehicle behind when changing lanes, it is desirable to match the storage distance of the rear data to the maximum speed set on the road. When the maximum speed is low, the storage distance of the rear data is suppressed as compared with when the maximum speed is high, and thus it is possible to suppress the shortage of the available capacity of the log data storage area 150.

In the third example, the storage distance of the rear data is switched depending on whether or not the legal maximum speed is equal to or higher than a threshold speed. If the legal maximum speed is equal to or higher than the threshold speed, the storage distance of the rear data is increased, and if the legal maximum speed is lower than the threshold value, the storage distance of the rear data is decreased. The threshold speed of the legal maximum speed may be set to any speed. The storage distance of the rear data may be set to any distance.

Figure 5:
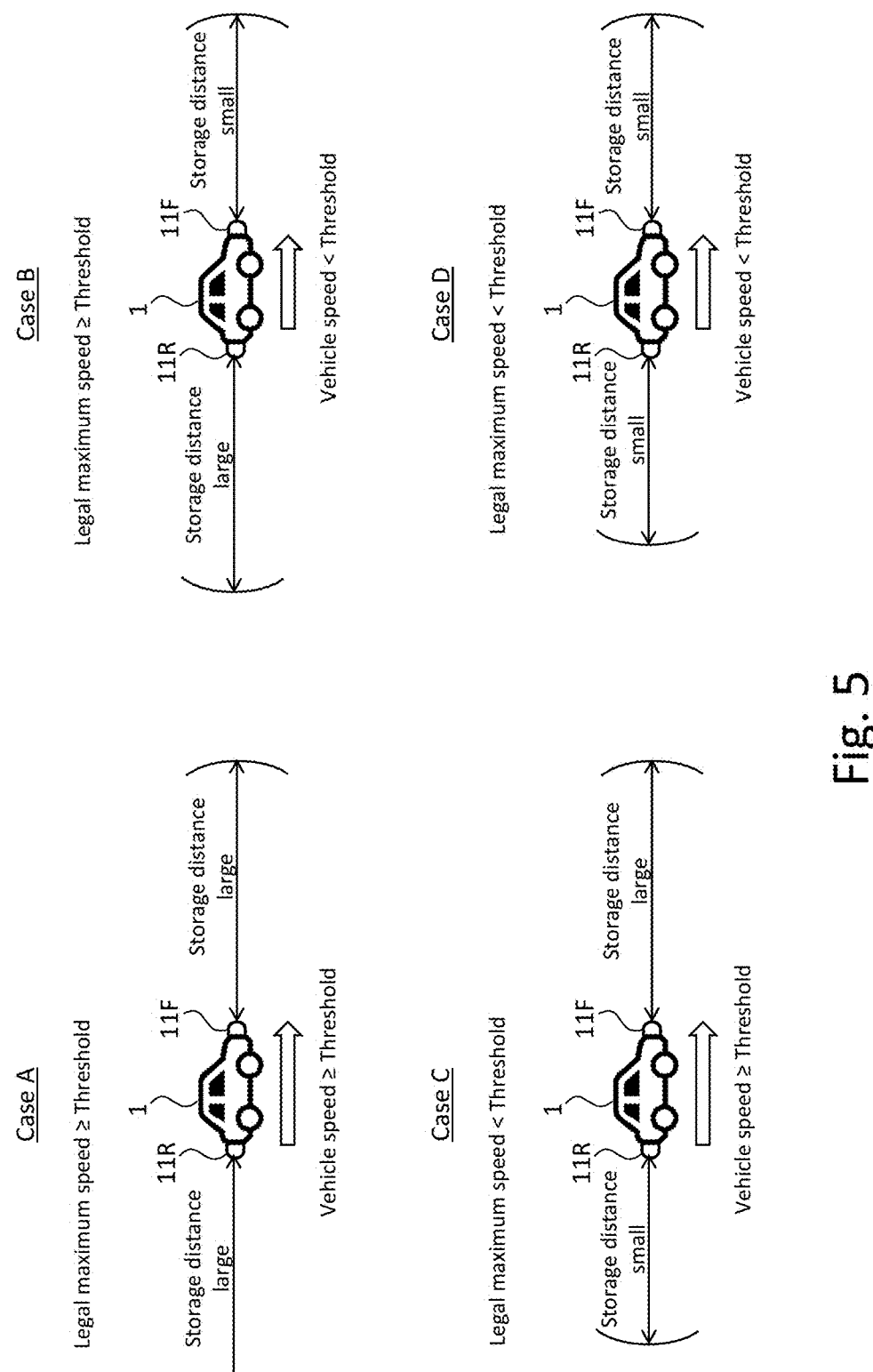
FIG. 5 is a conceptual diagram for explaining a third example of processing for reducing the data storage amount according to the embodiment.

FIG. 5 is a conceptual diagram for explaining the third example. FIG. 5 illustrates four cases A to D regarding the setting of the data storage distance. Each of the cases shows the data storage distances of the front and rear data acquired by the front LiDAR 11F and the rear LiDAR 11R when the vehicle 1 is traveling on a multi-lane road.

A case A indicates a case where the legal maximum speed is equal to or higher than the threshold speed and the vehicle speed is equal to or higher than the threshold speed. In the case A, the data storage distance of the front data is increased, and the data storage distance of the rear data is increased.

A case B indicates a case where the legal maximum speed is equal to or higher than the threshold speed and the vehicle speed is lower than the threshold speed. In the case B, the data storage distance of the front data is decreased, and the data storage distance of the rear data is increased.

A case C indicates a case where the legal maximum speed is less than the threshold speed and the vehicle speed is equal to or higher than the threshold speed. In the case C, the data storage distance of the front data is increased, and the data storage distance of the rear data is decreased.

A case D indicates a case where the legal maximum speed is less than the threshold speed and the vehicle speed is less than the threshold speed. In the case D, the data storage distance of the front data is decreased, and the data storage distance of the rear data is decreased.

In the third example, the storage distance of the rear data is switched depending on whether the legal maximum speed is equal to or higher than the threshold speed. However, the storage distance of the rear data may be changed in conjunction with the legal maximum speed. For example, the storage distance of the rear data may be increased by 10 m when the legal maximum speed is increased by 10 km/h, and the storage distance of the rear data may be decreased by 10 m when the legal maximum speed is decreased by 10 km/h.

2-4. Fourth Example

In the fourth example of processing for reducing the data storage amount, a camera that captures an image of the front of the vehicle 1 is provided as the recognition sensor 11. Image data acquired by the camera is a reduction target of the data storage amount.

Increasing the image compression rate of the camera or decreasing the sampling rate of the camera is a typical method for suppressing the data amount of image data. Further, the effective distance of image data is shortened by increasing the image compression rate or decreasing the sampling rate. Therefore, increasing the image compression rate or decreasing the sampling rate is substantially equivalent to reducing the data storage distance of the image data.

In the third example, the image compression rate of the camera is switched depending on whether or not the vehicle speed is equal to or higher than the threshold value. If the vehicle speed is equal to or higher than the threshold speed, the image compression rate is decreased, and if the vehicle speed is lower than the threshold speed, the image compression rate is increased. The sampling rate of the camera may be used instead of the image compression rate. In this case, the sampling rate is increased when the vehicle speed is equal to or higher than the threshold speed, and the sampling rate is decreased when the vehicle speed is lower than the threshold speed.

Figure 6:
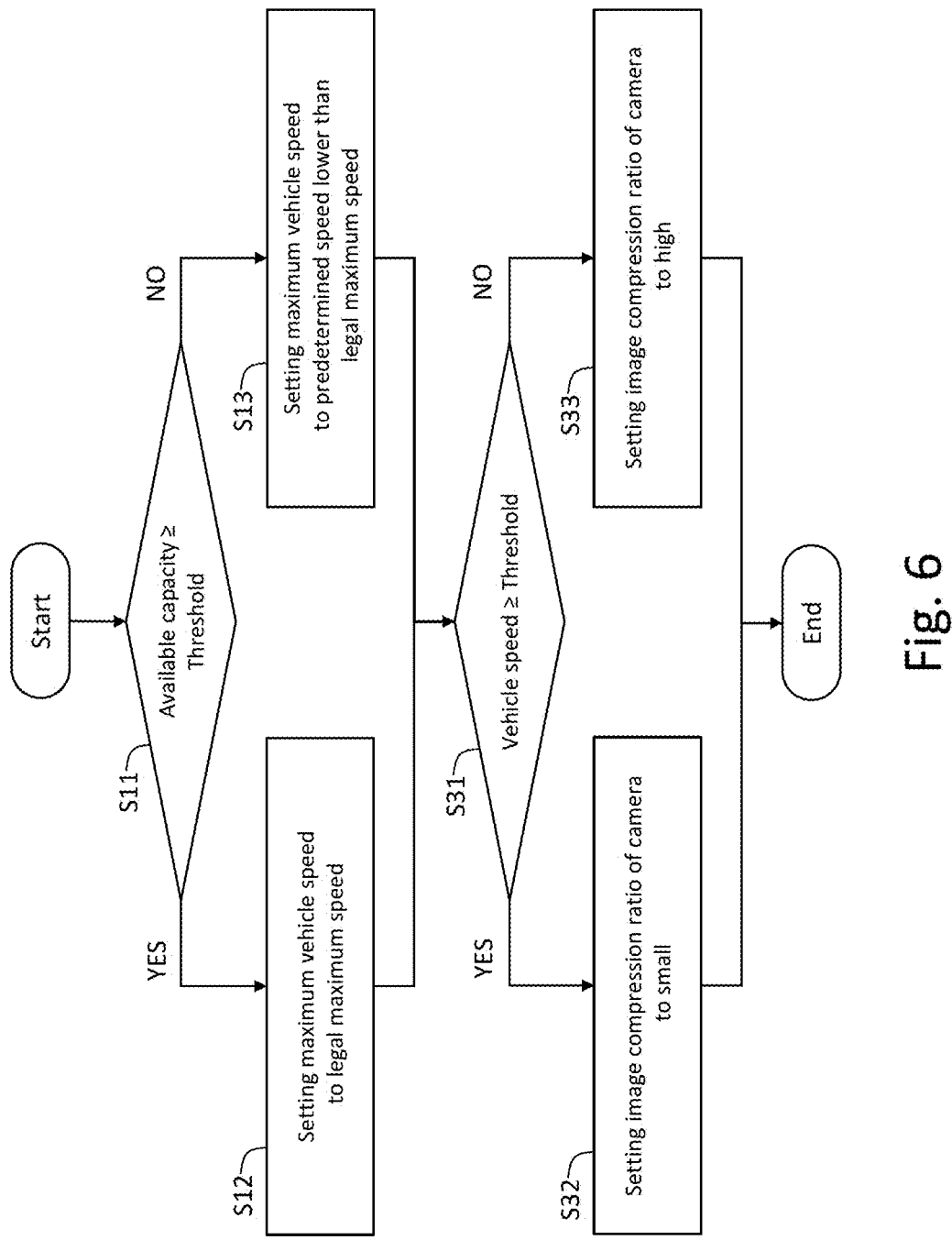
FIG. 6 is a conceptual diagram for explaining a fourth example of processing for reducing the data storage amount according to the embodiment.

FIG. 6 is a flowchart for explaining the fourth example. In the fourth example, the processing for reducing the data storage amount is performed according to the procedure illustrated in the flowchart. Steps S11 to S13 in the flowchart are processes for limiting the maximum vehicle speed in accordance with the available capacity of the log data storage area 150 as described in the second example. Steps S31 to S33 executed after these processes are processes for increasing the image compression rate of the camera in accordance with the vehicle speed.

In the fourth example, step S31 is executed after step S12 or step S13. In step S31, it is determined whether the vehicle speed is equal to or higher than a threshold speed. If the vehicle speed is equal to or higher than the threshold speed, the image compression rate is set to a small value in step S32. If the vehicle speed is less than the threshold value, the image compression rate is set to a large value in step S33. When the available capacity of the log data storage area 150 is less than the threshold value, the probability that the vehicle speed will be less than the threshold speed increases due to the maximum vehicle speed being suppressed. As a result, the vehicle speed becomes less than the threshold speed with a higher probability than in a case where the available capacity is equal to or greater than the threshold value, and thus the image compression rate is easily increased, and the shortage of the available capacity of the log data storage area 150 is suppressed.

In the fourth example, the image compression rate is switched depending on whether the vehicle speed is equal to or higher than the threshold speed, but the image compression rate may be continuously changed in conjunction with the vehicle speed. Similarly, the sampling rate may be continuously changed in conjunction with the vehicle speed.

2-5. Fifth Example

Two or more of the first to fourth examples described above may be combined. For example, the third example may be combined with the second example. That is, the process of limiting the maximum vehicle speed according to the available capacity of the log data storage area 150, the process of limiting the storage distance of the front data according to the vehicle speed, and the process of limiting the storage distance of the rear data according to the legal maximum speed may be combined.

The fourth example may be combined with the third example. That is, the process of limiting the maximum vehicle speed in accordance with the available capacity of the log data storage area 150, the process of increasing the image compression rate of the front camera in accordance with the vehicle speed, and the process of increasing the image compression rate of the rear camera in accordance with the legal maximum speed may be combined. In this combination, the sampling rate may be decreased instead of increasing the image compression rate.

In a case where the object included in the recognition result information RES is only a wall, the point group data or the image data is less useful in the verification of the autonomous driving. Therefore, in each of the above examples, the point group data and the image data when only the wall is recognized may not be stored regardless of the distance. This can more effectively suppress the shortage of the available capacity of the log data storage area 150.

What is claimed is:

1. A vehicle travelable by autonomous driving, comprising:

a sensor configured to recognize an object around the vehicle;

at least one processor; and at least one memory storing a plurality of instructions executable by the at least one processor, wherein the plurality of instructions is configured to cause the at least one processor to:

store data acquired by the sensor during execution of the autonomous driving, and suppress a storage distance of the data in response to a speed of the vehicle being low, as compared to in response to the speed of the vehicle being high.

2. The vehicle according to claim 1, wherein the plurality of instructions is configured to further cause the at least one processor to:

suppress a maximum speed of the vehicle in response to an available capacity of a storage area for storing the data being small, as compared to in response to the available capacity of the storage area for storing the data being large.

3. The vehicle according to claim 2, wherein the plurality of instructions is configured to further cause the at least one processor to suppress the maximum speed in proportion to a difference between the available capacity and a threshold.

4. The vehicle according to claim 1, wherein the sensor is a LiDAR, and the plurality of instructions is configured to further cause the at least one processor to:

change a storage distance of point group data acquired by the LiDAR according to the speed.

5. The vehicle according to claim 4, wherein the storage distance corresponds to a distance of a point group at a position farthest from the vehicle among a plurality of point groups of which data is stored in the at least one memory.

6. The vehicle according to claim 4, wherein the plurality of instructions is configured to further cause the at least one processor to set a distance required for the vehicle to stop as a minimum storage distance for the storage distance of the point group data.

7. The vehicle according to claim 1, wherein the sensor includes:

a front sensor configured to recognize an object in front of the vehicle, and a rear sensor configured to recognize an object behind the vehicle, and the plurality of instructions is configured to further cause the at least one processor to:

suppress a storage distance of front data acquired by the front sensor when the speed is low, as compared to when the speed is high, and suppress a storage distance of rear data acquired by the rear sensor in response to a maximum speed set for a multi-lane road on which the vehicle travels being low, as compared to when the maximum speed set for the multi-lane road on which the vehicle travels being high.

8. The vehicle according to claim 1, wherein the sensor is a camera, and the plurality of instructions is configured to further cause the at least one processor to:

change an effective distance of image data acquired by the camera in accordance with the speed by changing an image compression rate or a sampling rate of the camera in accordance with the speed.

* * * * *